United States Patent [19]

Smouse et al.

[11] 4,038,436

[45] July 26, 1977

[54] MARGARINE-LIKE PRODUCT HAVING CONTROLLED BROWNING PROPERTIES

[75] Inventors: Thomas H. Smouse, Plano; James K. Maines, Dallas; Robert R. Allen, Plano, all of Tex.

[73] Assignee: Anderson, Clayton & Co., Houston, Tex.

[21] Appl. No.: 317,420

[22] Filed: Dec. 21, 1972

[51] Int. Cl.² .............................................. A23D 3/00
[52] U.S. Cl. .................................................... 426/603
[58] Field of Search ................ 426/41, 189, 603, 604

[56] References Cited

U.S. PATENT DOCUMENTS

| 1,038,545 | 9/1912 | Ellis ........................................ 426/189 |
| 2,983,615 | 5/1961 | Melnick ................................. 426/189 |
| 3,245,802 | 4/1966 | Pardun ................................... 426/189 |

*Primary Examiner*—Joseph M. Golian
*Attorney, Agent, or Firm*—Fulbright & Jaworski

[57] ABSTRACT

A food product resembling either solid or liquid margarine which resists burning or blackening when heated. The product contains between about 0.20 and 0.63% by weight protein from complete milk solids or milk whey with less than about 2000 parts per million by weight of reducing sugar in the final product.

4 Claims, No Drawings

MARGARINE-LIKE PRODUCT HAVING CONTROLLED BROWNING PROPERTIES

BACKGROUND OF THE INVENTION

The field of art to which the invention pertains is a margarine-like product. Both plastic and liquid margarines are defined in 21 Code of Regulation Sections 45.1 and 45.2, respectively, which regulations are commonly referred to as the "Standards of Identity" for margarine. Margarine, as defined in the Standards of Identity must include at least 80% fat. There is on sale in the marketplace a material which conforms with the Standards of Identity for margarine except it has less than 80% fat. This is an imitation margarine and is purchased by people who prefer less fat. The food product of the present invention also might be described as an "imitation" margarine because it contains protein that is not presently within the Standards of Identity for margarine. However, we prefer to call this material a "margarine-like product" as it may very well be that the Standards of Identity will be changed to include the protein sources mentioned in the claims of this patent application.

Therefore, the term margarine-like product as used herein means a food, other than butter, which has the general characteristics of margarine defined by the Standards of Identity whether or not the material is within the Standards of Identity.

Under the Standards of Identity, margarine must contain an aqueous phase in addition to the 80% fat. This aqueous phase is normally the bulk of the material in a margarine other than the fat, and the type of aqueous phase used is one common method of designating the margarine. When describing margarines by the aqueous phase, they are referred to either as (a) milk margarine, (b) soybean margarine, or (c) water margarine. Milk margarine contains, in addition to the fat, (i) cream, (ii) milk, (iii) skimmed milk, (iv) liquid sweet cream buttermilk, (v) any combination of dry or condensed sweet cream buttermilk and water with a total solids content of not less than 8.5%, (vi) any combination of nonfat dry milk and water, in which the weight of the nonfat dry milk is not less than 10% of the weight of the water, and (vii) any mixture of two or more of the ingredients named in (i) through (vi) of this sentence. In soybean margarine, the aqueous phase includes any combination of finely ground soybeans and water in which the weight of the finely-ground soybeans is not less than 10% of the weight of the water. In water margarine, the aqueous phase is water.

Most of the margarine sold at retail in this country is milk margarine as its taste and other characteristics are more desirable than those of soybean or water margarine. However, milk margarine will blacken and burn when heated to frying temperatures. For example, nonfat dry milk margarine (and butter also) when heated to 350° F. will burn within 2 minutes forming a black curd and an obnoxious burnt odor. This excessive burning has limited the use of milk margarine in frying operations.

Water margarine does not burn, but it is unsatisfactory for several reasons. Similarly, soybean margarine normally does not burn or blacken, but it has an objectionable odor when heated.

The present invention gives a margarine-like product which has the general characteristics of a milk margarine but does not burn or blacken during frying at typical frying temperatures of 350° F. or less. Instead, the color of this product during frying can be controlled to give varying degrees of browning or to eliminate any appreciable change in color if that should be desired.

As far as the prior art is concerned, the disclosures in U.S. Pat. No. 3,245,802 issued Apr. 12, 1966 upon the application of Hermann Pardun for Antispattering Milk Margarine and Its Preparation, and U.S. Pat. No. 3,271,166 issued Sept. 6, 1966 upon the application of Geert Jan Van Leeuwen, et al. for Cooking Fat Composition are somewhat relevant. There has also been work done in the field of reducing the browning or blackening of potatoes during frying. Patents in this area include U.S. Pat. No. 2,498,024 issued Feb. 21, 1950 upon the application of John L. Baxter for Prefrying Treatment of Potatoes; U.S. Pat. No. 2,589,591 issued Mar. 18, 1952 upon the application of Paul A. Xander for Method of Controlling Color and Flavor in Potato Chips; U.S. Pat. No. 2,744,017 issued May 1, 1956 upon the application of Robert Russel Baldwin for Removal of Sugars by Enzymatic Process; U.S. Pat. No. 2,762,709 issued Sept. 11, 1956 upon the application of M.A. Janis, et al. for Treating Method for Potatoes; U.S. Pat. No. 2,816,037 issued Dec. 10, 1957 upon the application of Robert L. Olson, et al. for Utilization of By-Product Potato Pieces; U.S. Pat. No. 3,109,739 issued Nov. 5, 1963 upon the application of Barney W. Hilton for Potato Products and Process For Making Same; and U.S. Pat. No. 3,436,229 issued Apr. 1, 1969 upon the application of T.W. Simpson for Method of Cooking Potato Chips to Increase Fluffiness and Prevent Browning.

SUMMARY OF THE INVENTION

It is a general object of the present invention to provide a margarine-like product having the acceptable characteristics of milk margarine which product does not burn in normal frying operations and in which the degree of browning during frying is controlled to the desired level or is eliminated.

Other and further objects, features and advantages will be apparent from the following description of the invention given for the purpose of disclosure.

The aqueous phase of milk and soybean margarines contains protein. The present invention is based upon the discovery that a margarine-like product can be produced in which the degree of browning during frying can be controlled if this product contains between about 0.20 and 0.63% by weight protein which is derived from complete milk protein or milk whey, and if in the entire margarine-like product is less than about 2000 parts per million by weight of reducing sugar. If the reducing sugar is less than about 100 parts per million, there is normally no readily noticeable darkening or browning of the product during frying conditions. Between about 100 and 2000 parts per million by weight of reducing sugar, the product will take on an agreeable brown color during frying with the extent of the browning being increased as the amount of the reducing sugar is increased. Above approximately 2000 parts per million of reducing sugar, the product will become too dark during frying to be acceptable.

The desired taste and flavor characteristics are not present in the product if the protein content is reduced below about 0.20%. The maximum amount of protein could probably be increased above 0.63% and have an acceptable product taste-wise, but it is not economical to do so. Protein sources such as sodium caseinate, casein, cottonseed isolate, peanut isolate, cocoanut isolate, soy protein isolate and wheat gluten have been tested and found to be satisfactory to prevent burning during frying, but their taste and odor characteristics are not as acceptable as the taste and odor characteristics of milk protein.

In comparison with the present development, nonfat dry milk margarine typically contains above 7000 parts per million of reducing sugar. Other milk margarines also contain well in excess of 2000 parts per million of reducing sugar since nonfat dry milk is the product resulting from the removing of fat and water from milk, but it still contains the lactose, milk proteins and milk minerals in the same relative proportions as in the fresh milk from which it was made.

By the term "reducing sugar", as used herein, is means lactose, maltose, fructose, glucose, mannose, xylose and galactose and any other sugars which are oxidized by warm Fehling's solution. Lactose is the most commonly occurring of these reducing sugars in the proteins which are derived from milk.

It appears there can be used in the fat phase of the margarine-like product any of the conventional refined vegetable oils or animal fats used in margarine. If the fat phase has not been properly refined, browning may appear in the final product during frying with the reducing sugar content less than about 100 parts per million.

Applicants are not certain why the burning and blackening takes place in milk margarine, but it probably is a combination of charring of carmelization of the reducing sugar and the reaction of the reducing sugars with the amino acids in the protein. Applicants have found that if a margarine-like product is made with no protein but with reducing sugars present, there will still be a blackening and burning during frying if the sugar content is sufficiently high.

DESCRIPTION OF THE PREFERRED EMBODIMENT

Preferably the product is made in the manner in which a milk margarine is made under the Standards of Identity in which the aqueous phase includes nonfat dry milk and water except that the proper amount of complete milk protein or milk whey protein is used instead of the nonfat dry milk.

Complete milk protein is the presently preferred protein for use in the present invention. It is readily commercially available from several sources. Deltown Chemurgic Corporation of Yonkers, N.Y. sells complete milk protein under the trade name Dellac CMP which contains 88.5% protein and 1.3% reducing sugar measured as lactose. The Erie Casein Company of Erie, Ill. sells complete milk protein under the trade name Edible Low Cal Co-Precipitate which contains 90% protein and only 0.2% reducing sugar measured as lactose.

If protein from milk whey is to be used, preferably the protein source is low-lactose milk whey solids. Sweet milk whey solids contain about 72% lactose, but the bulk of this lactose can be removed and several manufacturers sell such a low-lactose milk whey solid. The low-lactose milk whey solids that were used in the examples hereinafter described that are stated to use a milk whey protein are sold under the trade name Essan 80 by Energy International Corporation of Minneapolis, Minn. This contains 80.5% protein on a moisture-free basis and no measurable lactose.

For a product which browns but does not burn during frying at about 350° F. or less, the preferred protein content is sufficient complete milk protein to give approximately 0.62% protein in the final product, and the preferred reducing sugar content is 0.1% measured as lactose. For a product which does not noticeably change color during such frying, the preferred complete milk protein is sufficient to give 0.62% by weight protein in the finished product, and the reducing sugar content preferably is 0.009% measured as lactose.

Set forth below in Table I are the results of various tests illustrating the present invention. In these tests, samples of plastic margarine were observed at 320° and 350° F. to determine the amount of browning or blackening, if any, that occurred. In making this test, an electric skillet was connected to a variable transformer and the voltage adjusted until the surface of the skillet measured either 320° or 350° F. by using a disc thermocouple connected to a pyrometer that had been calibrated with an oil bath and thermometer. When the surface temperature reached the desired level, a 50-gram portion of the product being tested was added to the hot surface and heated for 10 minutes. At the end of the 10-minute period, it was removed from the skillet and placed in a Pyrex beaker, allowed to cool and then transferred to a plastic petri dish. The tristimulus color coordinates and then the $\Delta E_w$ of these samples were determined to indicate the color of the heated material.

$\Delta E$ is a value which gives a comparison of the color of an object with a standard colored object. $\Delta E_w$ is used to denote the total color difference of a body from a white standard plate and $\Delta E_w$ approaches 0 for light or white colored bodies and 100 for dark or black colored bodies. Thus $\Delta E_w$ indicates lightness, hue and saturation, and mathematically is equal to the square root of the sum of the squares of the algebraic differences of the "L", $a$ and $b$ values between the two colored bodies being compared. The $a$ and $b$ coordinates are at right angles to each other in the horizontal plane of the color square, and the L coordinate is perpendicular to that plane. The $a$ axis is a redness-greenness dimension indicating red when plus, gray when zero and green when minus. The numbers on this axis range between $-80$ and $+80$. The b axis indicates a yellowness-blueness, being yellow when plus, gray when zero, and blue when minus. Its numbers range between $-80$ and $+80$. The L coordinate passes vertically through the point of intersection of the $a$ and $b$ coordinates and measures achromatic whites, grays and blacks. Its numbers range from 0 to 100 with 0 being black and 100 being white.

The L, $a$ and $b$ values of the various samples were determined by placing the samples in a tristimulus colorimeter which gives values from which the L, $a$ and $b$ values may be calculated. The particular tristimulus colorimeter used was Du-Color Model 220 made by Neotec Instruments, Inc. of Rockville, Md.

A product, which after frying, had a $\Delta E_w$ of less than 65 had not darkened nor browned, a product with a $\Delta E_w$ between 65 and 85 had browned, and a product which had a $\Delta E_w$ of 85 or greater was considered to be burned.

Two control margarines were used. Control margarine A was a plastic margarine having a fat base of approximately 80% with the fat base being a blend of 54.0 ± 3% refined and bleached soybean oil that had been hydrogenated to a wijs iodine value of 109 ± 2, 16.0 ± 3% of a 100% hydrogenated soybean oil that had been hydrogenated to a wijs iodine value of 62 ± 2, and the remainder being a refined and bleached safflower oil. The base fat had a melting point of 94° F. 5454 pounds of this control margarine A was made in the typical manner of making margarines. This 5454 pounds was comprised of 1074.1 pounds of salted milk (840 gallons of water, 700 pounds of nonfat dry milk powder and 870 pounds of salt), 5.4 pounds of potassium sorbate, 186 grams of calcium disodium EDTA, 21.8 pounds of a mixture of mono-, di- and triglycerides used as emulsifier, 10.9 pounds lecithin, 3.35 pounds margarine flavor, 4338.5 pounds of base fat, 1 can of Vitamin A and carotene mix, and 250 ml. of starter distillate. The protein content of this control margarine A was 0.56% and its reducing sugar content measured as lactose was about 8000 parts per million.

Control B margarine was a plastic margarine made similar to control A margarine except that the protein content from the nonfat dry milk was approximately 0.2% and the reducing sugar content was 2850 parts per million measured as lactose.

In Table I below, the samples 1 through 7 were made in a manner and from ingredients very similar to control A margarine other than the protein source which was either nonfat dry milk, complete milk protein or low lactose milk whey or a combination of these proteins.

In Sample 1 there was 3 times as much complete milk protein by weight as nonfat dry milk, and in Sample 2 there was 17 times as much complete milk protein by weight as nonfat dry milk. Sample 3 contained 35 times as much milk whey as nonfat dry milk, and Sample 4 had 3 times as much milk whey protein as nonfat dry milk.

Sample 8 was very similar to control A margarine except that the base fat was water-washed and filtered lard which had been hydrogenated to a wijs iodine value of 58.0 ± 2 resulting in a base fat melting point of 106° F. and complete milk protein was used instead of nonfat dry milk. Sample 9 is the same as Sample 8 in the type of ingredients except that the protein came from a combination of complete milk protein and nonfat dry milk with there being three times as much by weight complete milk protein as nonfat dry milk. Samples 10 and 11 are similar to control A margarine except that the protein source was a combination of complete milk protein and nonfat dry milk. In Sample 10 there was approximately three times as much complete milk protein as nonfat dry milk, and in Sample 11 the ratio of complete milk protein to nonfat dry milk was 4.3 to 6.0.

TABLE I

| | | Plastic Margarine | | | |
|---|---|---|---|---|---|
| Sample | Protein Source | Protein Content | Reducing Sugar Content As Lactose (PPM) | Observed As | $\Delta E_w$ 320° F/350° F |
| Control A | NFDM* | 0.56% | 8000 | Burned | 88.0/91.1 |
| Control B | NFDM | 0.20% | 2850 | Burned | 85.0/87.9 |
| 1 | CMP** & NFDM | 0.50% | 996 | Browned | 75.6/77.8 |
| 2 | CMP & NFDM | 0.52% | 210 | Browned | 71.5/70.1 |
| 3 Milk | Whey & NFDM | 0.56% | 101 | Browned | 65.6/65.2 |
| 4 Milk | Whey & NFDM | 0.56% | 1005 | Browned | 75.1/78.0 |
| 5 | CMP | 0.54% | 81 | No Brown | 55.8/58.5 |
| 6 | CMP | 0.54% | 37 | No Brown | 42.6/43.9 |
| 7 | Milk Whey | 0.51% | 0 | No Brown | 62.4/61.6 |
| 8 | CMP | 0.56% | 12 | No Brown | 59.4/62.5 |
| 9 | CMP & NFDM | 0.56% | 1000 | Browned | 79.0/81.3 |
| 10 | CMP & NFDM | 0.62% | 1012 | Browned | 72.3/77.3 |
| 11 | CMP & NFDM | 0.20% | 1003 | Browned | 72.5/74.0 |

*Nonfat Dry Milk
**Complete Milk Protein

Set forth in Table II are the results of various tests illustrating the present invention with liquid margarine. A control liquid margarine was made having a fat base of approximately 80% with the fat base being a blend of 94.5% ± 1% refined and bleached soybean oil having a wijs iodine value of 128 ± 3, 1.0% refined and bleached safflower oil having a wijs iodine value of 144 ± 4, 4.5% of 100% hydrogenated soybean oil having a wijs iodine value of 62 ± 2, and 0.5% of 60 titer cottonseed oil having a wijs iodine value of 4.0 ± 1. 2000 pounds of this liquid margarine was made in the typical manner of making liquid margarines. This 2000 pounds was comprised of 349 pounds of liquid milk (317 pounds of water and 32 pounds of nonfat dry milk powder), 2.0 pounds of potassium sorbate, 8.0 pounds of a mixture of mono-, di- and triglycerides used as emulsifier, 4.0 pounds of lecithin, 45 pounds of sodium chloride, 1592 pounds of base fat, 36.7 grams of Vitamin A and carotene mix, 90.7 grams of starter distillate and 32.8 grams of margarine flavor. The protein content of this control liquid margarine was 0.62% and its reducing sugar content measured as lactose was about 8850 parts per million.

3000 grams of this control liquid margarine contained 53.1 grams of nonfat dry milk. The liquid margarine of Sample 1 of Table II was made identical to the control sample except in place of 53.1 grams of nonfat dry milk there were 6 grams of nonfat dry milk and 18.3 grams of complete milk protein. Sample 2 of Table II was made the same as the control sample except in place of the 53.1 grams of nonfat dry milk, 20.6 grams of complete milk protein was used.

TABLE II

| | | Liquid Margarine | | | |
|---|---|---|---|---|---|
| Sample | Protein Source | Protein Content | Reducing Sugar Content As Lactose (PPM) | Observed As | $\Delta E_w$ 320° F/350° F |
| Control | NFDM | 0.62% | 8850 | Burned | 93.6/99.3 |
| 1 | CMP & NFDM | 0.62% | 1012 | Browned | 77.6/80.7 |
| 2 | CMP | 0.62% | 14 | No Brown | 57.1/58.0 |

From the foregoing discussion, examples and description of the invention, it is apparent that the objects set forth herein as well as others have been achieved. Those skilled in the art will recognize that the principles of this invention may be applied in several ways, only a few of which have been exemplified here specifically.

What is claimed is:

1. In a margarine-like product, the improvement comprising such product containing:
   a. between about 0.20 and 0.63% by weight protein selected from a source which is the class consisting of complete milk protein and milk whey, and
   b. less than about 2000 parts per million by weight of reducing sugar.

2. The product of claim 1 containing less than about 100 parts per million of reducing sugar.

3. The product of claim 1 containing in excess of about 100 parts per million by weight of reducing sugar.

4. The product of claim 1 in which the source of protein includes milk whey solids from which at least a portion of the reducing sugar has been removed.

* * * * *